(12) United States Patent
Patil et al.

(10) Patent No.: US 8,484,497 B2
(45) Date of Patent: Jul. 9, 2013

(54) POWER SUPPLY CONTROL WITHIN AN INTEGRATED CIRCUIT

(75) Inventors: Sanjay Bhagwan Patil, Austin, TX (US); Valentina Gomez, Austin, TX (US); Antony Sebastine, Austin, TX (US)

(73) Assignee: ARM Limited, Cambridge (GB)

( * ) Notice: Subject to any disclaimer, the term of this patent is extended or adjusted under 35 U.S.C. 154(b) by 311 days.

(21) Appl. No.: 12/805,373

(22) Filed: Jul. 27, 2010

(65) Prior Publication Data

US 2012/0030489 A1  Feb. 2, 2012

(51) Int. Cl.
| | |
|---|---|
| *G06F 1/00* | (2006.01) |
| *G05F 1/00* | (2006.01) |
| *G05F 1/46* | (2006.01) |
| *H01H 9/54* | (2006.01) |
| *H01H 7/00* | (2006.01) |

(52) U.S. Cl.
USPC ........... 713/323; 713/300; 713/330; 323/265; 323/349; 307/140; 307/141

(58) Field of Classification Search
USPC ........... 713/300, 320; 307/140, 141; 323/265, 323/349
See application file for complete search history.

(56) References Cited

U.S. PATENT DOCUMENTS

| | | | | |
|---|---|---|---|---|
| 7,956,677 | B2 * | 6/2011 | Igarashi et al. | 327/544 |
| 8,074,086 | B1 * | 12/2011 | Sancheti et al. | 713/300 |
| 8,139,436 | B2 * | 3/2012 | Chen et al. | 365/229 |
| 8,183,713 | B2 * | 5/2012 | Rao et al. | 307/38 |
| 2008/0059824 | A1 * | 3/2008 | Rowhani et al. | 713/324 |

OTHER PUBLICATIONS

Calimera et al., "Optimal MTCMOS Reactivation Under Power Supply Noise and Performance Constraints", *EDAA '8*, 2008, 6 pages.
Calimera et al., "Design of a Flexible Reactivation Cell for Safe Power-Mode Transition in Power-Gated Circuits", *IEEE Transactions on Circuits and Systems*, vol. 56, No. 9, Sep. 2009, pp. 1979-1993.
Kim et al., "Understanding and Minimizing Ground Bounce During Mode Transition of Power Gating Structures", *IEEE*, pp. 22-25, Aug. 25-27, 2003.
"Design of the Power Switching Network", Chapter 14.

* cited by examiner

*Primary Examiner* — Stefan Stoynov
(74) *Attorney, Agent, or Firm* — Nixon & Vanderhye, PC

(57) ABSTRACT

An integrated circuit 2 is provided with a first power supply conductor 8 coupled via header transistors 14 to 26 to a second power supply conductor 10. Logic circuitry 4, 6 draws its power supply from the second power supply conductor. When switching from a sleep mode to an operating mode the header transistors 14 to 26 are divided into a plurality of sets of transistors which are switched on in a predetermined sequence using controller circuitry 28. The controller circuitry 28 senses the voltage of the second power supply conductor 10 to determine when each set of header transistors should be switched on. In this way, the in-rush current within the integrated circuit 2 associated with the switch from the sleep state to the operating state can be held within a predetermined range of a target in-rush current.

23 Claims, 8 Drawing Sheets

$$i\_rush = C\_decap * \frac{d}{dt}(V_{dds})$$

if $\frac{d}{dt}(i\_rush) = \emptyset$, then $$C\_decap * \frac{d^2}{dt^2}(V_{dds}) = \emptyset$$

$$\Rightarrow \frac{d^2}{dt^2}(V_{dds}) = 0$$

and $\frac{d}{dt}(V_{dds}) = $ constant

FIG. 2

| Total Cells | Incremental Count | Stage | |
|---|---|---|---|
| 107 | 107 | 1 | |
| 111 | 4 | 2 | |
| 115 | 4 | 3 | |
| 130 | 15 | 4 | |
| 136 | 6 | 5 | TRICKLE |
| 154 | 18 | 6 | |
| 165 | 11 | 7 | |
| 258 | 93 | 8 | |
| 357 | 99 | 9 | |
| 523 | 166 | 10 | |
| 10767 | | 11 | HAMMER |

POWER SUPPLY CONTROL WITHIN AN INTEGRATED CIRCUIT

BACKGROUND OF THE INVENTION

1. Field of the Invention

This invention relates to the field of integrated circuits. More particularly, this invention relates to the control of the power supply to logic circuitry within integrated circuits.

2. Description of the Prior Art

It is known to provide integrated circuits with a virtual power supply rail for supplying power to logic circuitry. The virtual power supply rail is connected via header of footer transistors to the main power supply and by switching on and switching off these header or footer transistors the logic circuitry may be connected or disconnected from the power supply. This technique is useful in removing the power supply to logic circuitry which is inactive so as to reduce the power consumption of the integrated circuit.

When it is desired to switch from the inactive state to the active state, the header and/or footer transistors are switched on. This can result in an excessive in-rush current within the integrated circuit as the capacitance associated with the logic circuitry and the virtual power rails charges to the supply voltage. Excessive in-rush currents can produce erroneous operation and damage the integrated circuit. For this reason, it is known to take measures to reduce the in-rush current when switching on the power supply to a virtual power rail. Known techniques for reducing the in-rush current include only switching on a few of the header and/or footer transistors at first and then gradually switching on the remainder of the header and/or footer transistors in a sequence triggered by control signals tapped from a delay line. A problem with this approach is that the control of the switching on of the header and/or footer transistors must be performed with a sufficient margin that even in corner cases of process, voltage and temperature characteristics of an individual circuit the in-rush current will not exceed an acceptable level. This safe margining has the result that the switching on of the header and/or footer transistors will typically be slower than would be possible resulting in a disadvantageous increase in the latency associated with switching on the power supply to the virtual rails.

SUMMARY OF THE INVENTION

Viewed from one aspect the present invention provides an integrated circuit comprising:

a first power supply conductor configured to connect to an electrical power source;

a second power supply conductor;

a plurality of transistors configured to provide a current path from said first power supply conductor to said second power supply conductor;

logic circuitry coupled to said second power supply conductor and configured to draw electrical power from said second power supply conductor; and controller circuitry coupled to said plurality of transistors and configured to control said plurality of transistors to switch from a high impedance state to a low impedance state of varying degree and thereby supply electrical power from said electrical power source to said logic circuitry via said first power supply conductor, said plurality of transistors and said second power supply conductor; wherein said plurality of transistors are divided in to a plurality of sets of transistors, each set being switched together from said high impedance state to said low impedance state under control of said controller circuitry;

said controller circuitry is configured to switch said sets from said high impedance state to said low impedance state in a predetermined sequence; and said controller circuitry senses a voltage of said second power supply conductor and controls switching of said sets from said high impedance state to said low impedance state following said predetermined sequence in dependence upon said voltage.

The present technique recognises that the controller circuitry may be arranged to sense a voltage of the second power supply conductor and control a switching of the sets of transistors from the high impedance state to the low impedance state following the predetermined sequence in dependence upon this voltage. Thus, control of the switching on is in accordance with a feedback technique based upon the sensed voltage of the second power supply conductor and accordingly variations in individual integrated circuits due to process, voltage and temperature may be accommodated using this feedback control. This permits use of a reduced margin in the normal in-rush current provided and accordingly allows higher in-rush currents to be supported safely thereby advantageously reducing the latency associated with switching on the power to the virtual rail.

Each of the sets of transistors may have an associated trigger value of the voltage on the second power supply conductor at which the controller circuitry switches that set from the high impedance state to the low impedance state. Thus, each set of transistors can be arranged not to switch on until the voltage difference between the first power supply conductor and the second power supply conductor has reduced to below a predetermined level thereby ensuring that switching on the set of transistors concerned will not result in an excessive in-rush current.

Such an arrangement is conveniently provided when the trigger values associated with the sets monotonically increase between sets following the predetermined sequence in which the sets are switched on.

The controller circuitry may utilise a Schmitt trigger circuit for each set to sense when the voltage of the second power supply conductor reaches the associated trigger point so that the set should be switched on. Such Schmitt trigger circuits may be made resistant to process, voltage and temperature variation within individual circuits both individually and collectively as a set of Schmitt trigger circuits controlling the plurality of sets of transistors.

In some embodiments the trigger values used by the Schmitt trigger circuit may be programmable to allow fine tuning of the switch on process so that the in-rush current can be increased to a higher acceptable level, thereby reducing the latency associated with the switch on.

The Schmitt triggers may be conveniently provided with a reset circuit to force their reset so that they can be used for multiple power up and power down sequences.

The sets of transistors provide an additional current path between the first power supply conductor and the second power supply conductor. A reduction in latency by ensuring the in-rush current is towards the maximum of tolerable values may be achieved by providing these sets in a form with an impedance such that current flowing between the first power supply conductor and the second power supply conductor remains within a predetermined range as a voltage difference between the conductors decreases and the impedance of the transistors in the low impedance state decreases. Selecting the characteristics (e.g. number, size, type, etc) of the transistors taking into account their voltage/current characteristics at the voltage differences for which they will operate permits close to the maximum in-rush current to be maintained throughout the switch on operation despite the change in the impedance of the transistors which occurs as the voltage difference across them reduces.

It is desirable that the predetermined current range should extend around a target in-rush current to a level no less than 20 percent lower than the target in-rush current.

The switching associated with the present technique is particularly useful when switching between a sleep state in which the logic circuitry does not perform data processing operations and an operating state in which the logic circuitry does perform data processing operations.

Viewed from another aspect the present invention provides an integrated circuit comprising:

first power supply conductor means for connecting to an electrical power source;

second power supply conductor means for conducting power;

a plurality of transistor means for providing a current path from said first power supply conductor means to said second power supply conductor means;

logic means for drawing electrical power from said second power supply conductor means; and controller means for controlling said plurality of transistor means to switch from a high impedance state to a low impedance state and thereby supply electrical power from said electrical power source to said logic means via said first power supply conductor means, said plurality of transistor means and said second power supply conductor means; wherein said plurality of transistor means are divided in to a plurality of sets of transistor means, each set being switched together from said high impedance state to said low impedance state of varying degree under control of said controller means;

said controller means is configured to switch said sets from said high impedance state to said low impedance state in a predetermined sequence; and said controller means senses a voltage of said second power supply conductor means and controls switching of said sets from said high impedance state to said low impedance state following said predetermined sequence in dependence upon said voltage.

Viewed from a further aspect the present invention provides a method of operating an integrated circuit, said method comprising the steps of:

connecting to an electrical power source using a first power supply conductor;

conducting power with a second power supply conductor means;

providing a current path from said first power supply conductor to said second power supply conductor through a plurality of transistors;

drawing electrical power for logic circuitry from said second power supply conductor means; and controlling said plurality of transistors to switch from a high impedance state to a low impedance state of varying degree and thereby supply electrical power from said electrical power source to said logic circuitry via said first power supply conductor, said plurality of transistors and said second power supply conductors; wherein said plurality of transistors are divided in to a plurality of sets of transistors, each set being switched together from said high impedance state to said low impedance state;

said sets are switched from said high impedance state to said low impedance state in a predetermined sequence; and a voltage of said second power supply conductors is sensed and used to control switching of said sets from said high impedance state to said low impedance state following said predetermined sequence in dependence upon said voltage.

Viewed from a further aspect the present invention provides an integrated circuit comprising:

a first power supply conductor configured to connect to an electrical power source;

a second power supply conductor;

a plurality of transistors configured to provide a current path from said first power supply conductor to said second power supply conductor;

logic circuitry coupled to said second power supply conductor and configured to draw electrical power from said second power supply conductor; and controller circuitry coupled to said plurality of transistors and configured to control said plurality of transistors to switch from a high impedance state to a low impedance state and thereby supply electrical power from said electrical power source to said logic circuitry via said first power supply conductor, said plurality of transistors and said second power supply conductor; wherein said plurality of transistors are divided in to a plurality of sets of transistors, each set being switched together from said high impedance state to said low impedance state under control of said controller circuitry;

said controller circuitry is configured to switch said sets from said high impedance state to said low impedance state in a predetermined sequence; and each of said sets provides an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

It will be appreciated that the above described technique of selecting the characteristics of the transistors within each set of transistors that are switched on in the predetermined sequence so as to match the voltage/current characteristics at which they will operate may be used independently of the feedback control of the switch on timing. Even when operating in an open-loop manner in this way, a safe increase in the in-rush current may be achieved and a reduction in switch on latency provided.

Viewed from a further aspect the present invention provides an integrated circuit comprising:

first power supply conductor means for connecting to an electrical power source;

second power supply conductor means for conducting power;

a plurality of transistor means for providing a current path from said first power supply conductor means to said second power supply conductor means;

logic means for drawing electrical power from said second power supply conductor means; and controller means for controlling said plurality of transistor means to switch from a high impedance state to a low impedance state and thereby supply electrical power from said electrical power source to said logic means via said first power supply conductor means, said plurality of transistor means and said second power supply conductor means; wherein said plurality of transistor means are divided in to a plurality of sets of transistor means, each set being, switched together from said high impedance state to said low impedance state under control of said controller means;

said controller means is configured to switch said sets from said high impedance state to said low impedance state in a predetermined sequence; and each of said sets provides an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

Viewed from a further aspect the present invention provides a method of operating an integrated circuit, said method comprising the steps of connecting to an electrical power source using a first power supply conductor;

conducting power with a second power supply conductor means;

providing a current path from said first power supply conductor to said second power supply conductor through a plurality of transistors;

drawing electrical power for logic circuitry from said second power supply conductor means; and controlling said plurality of transistors to switch from a high impedance state to a low impedance state and thereby supply electrical power from said electrical power source to said logic circuitry via said first power supply conductor, said plurality of transistors and said second power supply conductors; wherein said plurality of transistors are divided in to a plurality of sets of transistors, each set being switched together from said high impedance state to said low impedance state;

said sets are switched from said high impedance state to said low impedance state in a predetermined sequence; and each of said sets provides an additional current path from said first power supply conductor means to said second power supply conductor means with an impedance such that a current flowing between said first power supply conductor means and said second power supply conductor means remains within a predetermined range as a voltage difference between said first power supply conductor means and said second power supply conductor means decreases and impedance of transistor means in said low impedance state decreases.

Viewed from a further aspect the present invention provides a method of designing an integrated circuit comprising:

a first power supply conductor configured to connect to an electrical power source;

a second power supply conductor;

a plurality of transistors configured to provide a current path from said first power supply conductor to said second power supply conductor;

logic circuitry coupled to said second power supply conductor and configured to draw electrical power from said second power supply conductor; and controller circuitry coupled to said plurality of transistors and configured to control said plurality of transistors to switch from a high impedance state to a low impedance state and thereby supply electrical power from said electrical power source to said logic circuitry via said first power supply conductor, said plurality of transistors and said second power supply conductor; wherein said plurality of transistors are divided in to a plurality of sets of transistors, each set being switched together from said high impedance state to said low impedance state under control of said controller circuitry; and said controller circuitry is configured to switch said sets from said high impedance state to said low impedance state in a predetermined sequence; said method of designing comprising:

selecting transistor of each of said sets to provide an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 schematically illustrates the relationship between in-rush current, virtual supply rail voltage and load capacitance;

DESCRIPTION OF EMBODIMENTS

Figure 1:
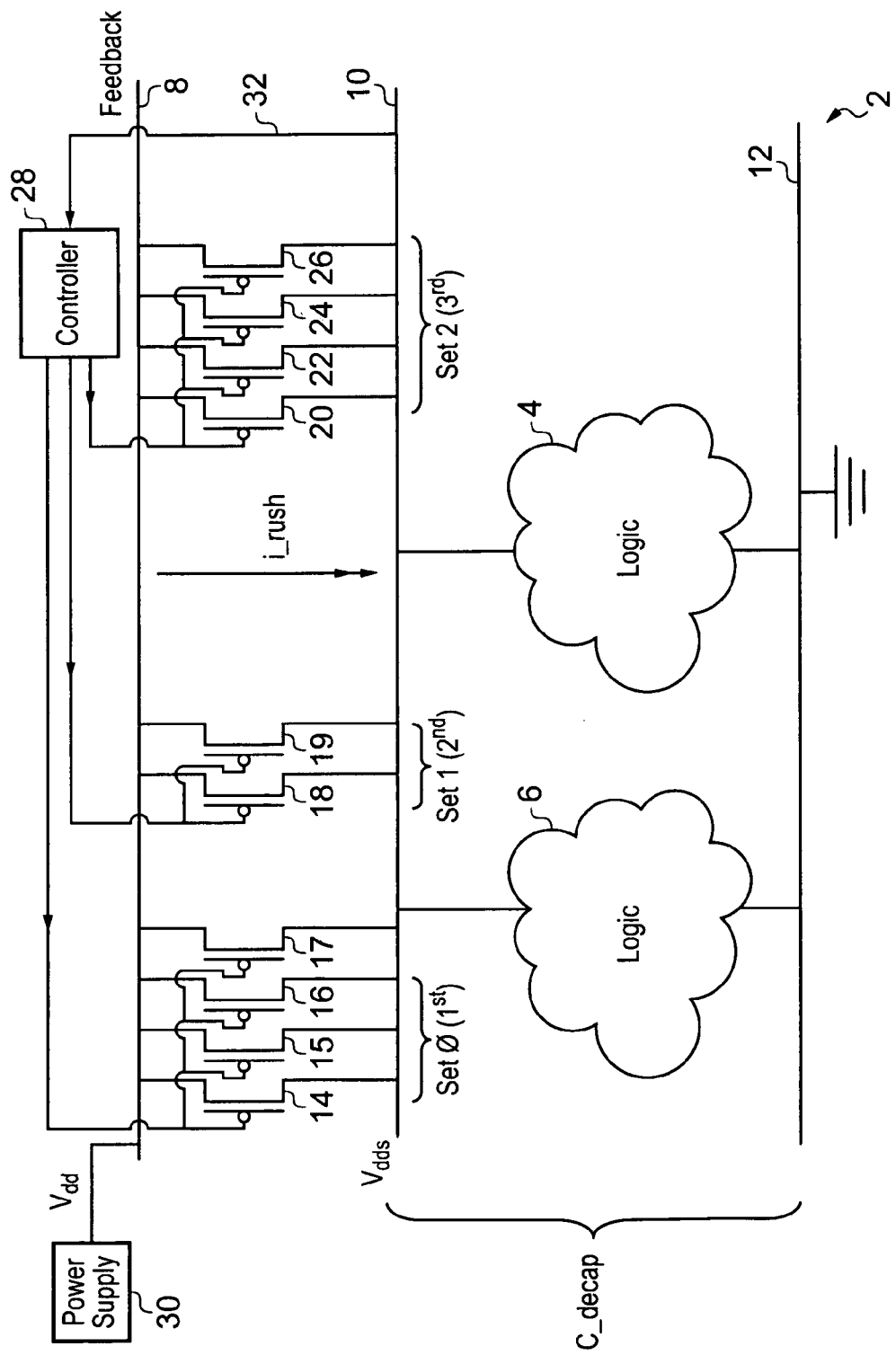
FIG. 1 schematically illustrates an integrated circuit employing a virtual power supply rail and header transistors.

FIG. 1 schematically illustrates an integrated circuit 2 including logic circuitry 4, 6, which can take a variety of different forms, such as processing circuitry which may be found in a microprocessor. The integrated circuit 2 further includes a first power supply conductor 8, a second power supply conductor 10 and a ground conductor 12. Disposed between the first power supply conductor 8 and the second power supply conductor 10 are a plurality of header transistors 14 to 26. These header transistors 14 to 26 are divided into a plurality of sets of transistors namely Set0 formed of transistors 14, 15, 16 and 17. Se11 formed of transistors 18 and 19, and Set2 formed of transistors 20, 22, 24, and 26. The transistors within each of these sets are switched on and switched off by control signals from control circuitry 28.

When the integrated circuit 2 is in an operating state all of the transistors 14 to 26 are turned on and the logic circuitry 4, 6 is supplied with electrical power from a power supply 30 via the first power supply conductor 8, the header transistors 14 to 26, the second power supply conductor 10 (the virtual rail), and the ground power supply conductor (ground rail). When it is desired to reduce power consumption, such as due static leakage currents, the integrated circuit 2 may be placed into a sleep mode. In this sleep mode, the logic circuitry 4, 6 is not able to process data. In the sleep mode all of the header transistors 14 to 26 are switched off and the second power supply conductor 10 is isolated from the first power supply conductor 8.

The controller circuitry 28 is responsible for controlling the switching on of the header transistors 14 to 26 so as to move from the sleep state to the operating state. In order that the in-rush current flowing from the first power supply conductor 8 through the remainder of the illustrated portion of the integrated circuit 2 does not become too large, the controller circuitry 28 operates to switch on the header transistors 14 to 26 in a predetermined sequence such that they are gradually switched on and an excessive in-rush current does not arise. The controller circuitry 28 switches on the header transistors 14 to 26 within each of the sets as a group. Firstly the first set composed of header transistors 14, 15, 16 and 17 is switched on (in practice the first set will contain enough transistors to reach the in-rush current limit—the first set will typically contain many more transistors than the second set). The voltage difference between the first power supply conductor 8 and the second power supply conductor 10 will be relatively high, the impedance of the first set of transistors 14, 15, 16 and 17 is set to limit the in-rush current to the maximum permitted and so achieve rapid wakeup without problems due to excess in-rush current. As the voltage distance between the first power supply conductor 8 and the second power supply conductor 10 starts to diminish, then so will the magnitude of the in-rush current. In order to reduce the time taken for the voltage of the second power supply conductor 10 to reach that of the first power supply conductor 8 it is desirable that the in-rush current should not fall significantly below the maximum in-rush current which may be tolerated (e.g. to a level no less than twenty percent below the target maximum in-rush current). For this reason, the controller circuitry 28 proceeds to switch on the second set of header transistors 18, 19. At this time both the header transistors 14, 15, 16 and 17 of the first set and the second set of transistors 18, 19 will be switched on and accordingly the impedance of the path between the first power supply conductor 8 and the second power supply conductor 10 will reduce. This compensates for the reduction in the voltage difference between the first power supply conductor 8 and the second power supply conductor 10 as the capacitive load associated with the second power supply conductor 10 and the logic circuitry 4, 6 is charged. As the voltage on the second power supply conductor 10 builds further, the controller circuitry 28 proceeds to switch on the third set of header transistors 20, 22, 24, 26. This again compensates for the ongoing reduction in the voltage difference in the first power supply conductor 8 and the second power supply conductor 10. Typically the second set of transistors will contain a small number of transistors and the number of transistors in each set will increase thereafter.

At the same time that the decrease in voltage difference between the first power supply conductor 8 and the second power supply conductor 10 tends to reduce the in-rush current, the impedance of the individual header transistors 14 to 26 will start to reduce as the these header transistors 14 to 26 move out of their saturated current flow mode of operation. As will be familiar to those in this technical field, at high potential difference across a transistor 14 to 26, the current flow will saturate at some maximum value and accordingly the impedance of the transistor will rise as further increases in voltage difference across the transistor will produce little, if any, increase in the current flowing through the transistor. However, as the voltage difference across the transistor falls, the transistor will move out of this saturated mode of operation and changes in voltage difference across the transistor will produce significant variations in current flowing through the transistors in a manner which effectively reduced the impedance of the transistors. Thus, while the reduction of voltage difference between the first power supply conductor 8 and the second power supply conductor 10 will tend to reduce the in-rush current, the voltage difference across the header transistors 14 to 26 will at some point move these out of their saturated mode of operation and their effective impedance will be reduced in a manner which moves counter to simply scaling the number of header transistors 14 to 26 switched on in a manner to directly compensate in proportion to the falling voltage difference between the first power supply conductor 8 and the second power supply conductor 10.

In practice, the transition from the sleep state to the operating state can be broken down into a predetermined sequence of stages each characterised by the voltage difference between the first power supply conductor 8 and the second power supply conductor 10 existing during those stages. At each of these predetermined stages, the characteristics of the header transistors 14 to 26 which have been switched on up to that point can be determined and together with the maximum tolerated in-rush current this can be used to calculate how many header transistors 14 to 26 need to be switched on at the next stage in the transition between the sleep state and the operating state. In this way, the number of header transistors 14 to 26 within each of the sets of the header transistors which are switched on in the predetermined sequence during the transition from the sleep state to the operating state may be determined.

It will be appreciated that in the above the variation between the sets of transistors has been explained in terms of the number of transistors within each set. It is equally possible that the number of transistors within each set could be constant and the physical sizes of these transistors varied in order to produce the desired amount of in-rush current at each voltage difference between the first power supply conductor and the second power supply conductor at which the set of transistors concerned starts to be switched on. It is also possible that the variation between sets could be a combination the number of transistors in each set and the characteristics of those transistors within each set.

It will further be appreciated that the example of FIG. 1 illustrates the use of header transistors. It is also possible that a similar arrangement may be used associated with footer transistors between a virtual ground and the ground power supply conductor 12. It is also possible that a combination of header transistors and footer transistors could be used.

FIG. 1 illustrates a feedback signal line 32 from the second power supply conductor 10 to the controller circuitry 28. This feedback signal line 32 permits the controller circuitry 28 to sense the instantaneous voltage of the second power supply conductor 10 during the transition between the sleep state and the operating state. This measured voltage can be used to control the timing at which each of the sets of header transistors 14 to 26 get switched on. Such feedback helps to accommodate process, voltage and temperature variations in individual integrated circuits as manufactured and/or during the operation due to environmental parameters, e.g. temperature. It is also possible that the control circuitry 28 may operate in an open-loop manner in which the different sets of header transistors 14 to 26 are switched on following the predetermined sequencing with predetermined delays between each set of header transistors 14 to 26 being switched on.

FIG. 2 schematically illustrates the relationship between in-rush currents and virtual rail voltage. The in-rush current is equal to the load capacitance associated with the logic circuitry 4, 6 and the second power supply conductor 10 multiplied by the rate change of the virtual rail voltage. In order to reduce the time taken to switch between the sleep state and the operating state it is desirable that the in-rush current should be held constant at close to the maximum in-rush current that can be tolerated without malfunction. Thus, the rate of change of the in-rush current should be zero. If the rate of change of the in-rush current is zero, then the second derivative with respect to time of the virtual rail voltage should also be zero. This in turn implies that the rate of change of the virtual rail voltage should be constant if the in-rush current is a constant.

Figures 3, 4:
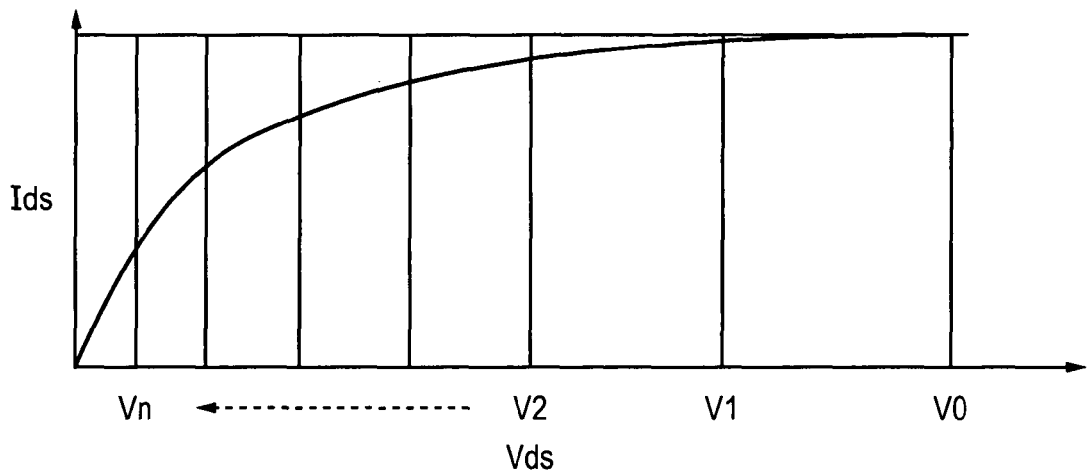
FIG. 3 schematically illustrates the variation in current flow through a transistor with voltage difference across the transistor.
FIG. 4 is a table giving one example of the numbers of transistors in a plurality of sets of transistors switched on in a predetermined sequence when moving from a sleep state to an operational state.

FIG. 3 schematically illustrates the electrical characteristics of a header transistor 14 to 26 in terms of the variation of the current flowing through the header transistor 14 to 26 compared with the voltage difference across the header transistor 14 to 26. As will be seen, as the voltage difference increases, the current flowing approaches a saturation current. At lower voltages the current varies linearly with the voltage difference. Thereafter the variation becomes non-linear. This corresponds to the impedance of the transistor gradually increasing as the voltage difference across the transistor increases until the saturation regime is reached at which the current will increase no further, even if the voltage difference across the transistor is increased. This effect must be taken into account when determining how many (or what type) of header transistors should be used within each of the set of header transistors in order to produce the desired target in-rush current at each voltage difference between the first power supply conductor 8 and the second power supply conductor 10.

FIG. 4 is a table showing the number of header transistors within each set of header transistors within a predetermined sequence of these sets which are switched on in turn. The first set (stage) of header transistors in this example contains 107 header transistors. This first set is the first to be switched on. Either a predetermined time after this first set has been switched on or when the controller circuitry 28 detects that the virtual rail voltage has reached a predetermined level, the second set of header transistors is switched on. In this example the second set contains four header transistors. The cumulative number of header transistors now switched on will be 111. This process continues through a sequence of ten sets of header transistors which respectfully contain 4, 15, 6, 18, 11, 93, 99 and 166 header transistors. The cumulative total of header transistors switched on as each of these new sets of header transistors is switched on will be 115, 130, 136, 154, 165, 258, 357 and 523. The charging of the logic circuitry 4, 6 and the second power supply conductor 10 using these sets of header transistors is a trickle mode within the transition from the sleep state to the operating state. At the end of the trickle mode, the virtual rail voltage is close to the power supply voltage. The final step in the process is switching on a large number of header transistors in a hammer set. The voltage difference between the first power supply conductor 8 and the second power supply conductor 10 at this time will be relatively low and the in-rush current associated with switching on this large number of header transistors will be acceptable. The large number of header transistors which are conductive after the hammer set of header transistors have been switched on is such that when the logic circuitry 4, 6 starts to process data and draw current, the virtual rail voltage will not dip to the point which will cause incorrect operation.

Figure 5:
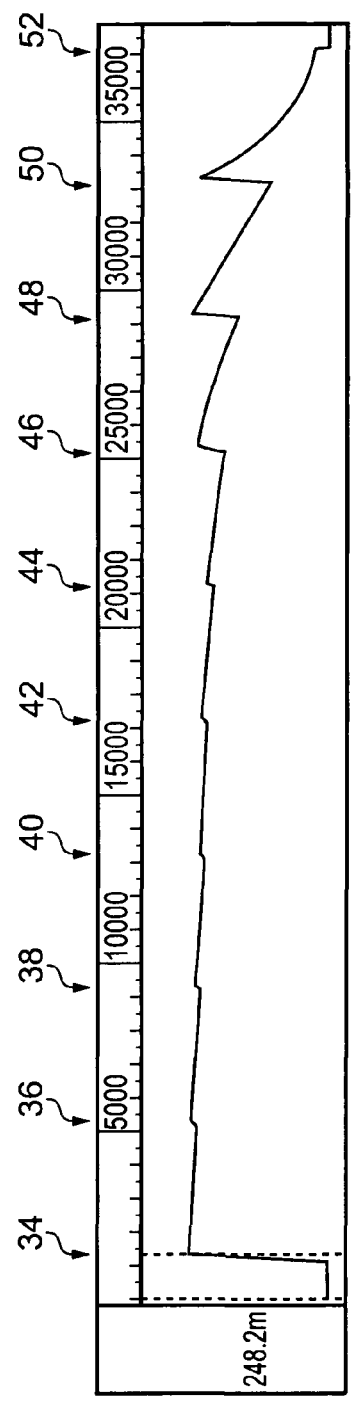
FIG. 5 schematically illustrates the variation in in-rush current with time.

FIG. 5 schematically illustrates a variation in-rush current with time during the switching on of the sets of header transistors in the predetermined sequence. At time 34 the change from the sleep state to the operating state is triggered and the in-rush current rises as the first set of header transistors are turned on. The in-rush current then slowly diminishes until at time 36 the second set of header transistors is switched on. Following this the in-rush current again slowly declines until time 38 at which the third set of header transistors is switched on. This process continues until all of the sets of header transistors are switched on, and at time 52 the hammer set of header transistors is switched on ready for the data processing by the logic circuitry 4, 6 to commence. It will be seen that while the action of the sizing and number of header transistors switched on at each time during the predetermined sequence seeks to maintain the in-rush current at a level close to the target level associated with the maximum permitted in-rush current, there will be some variation in the in-rush current. This variation is preferably limited to plus or minus 20 percent of the target in-rush current.

Figure 6:
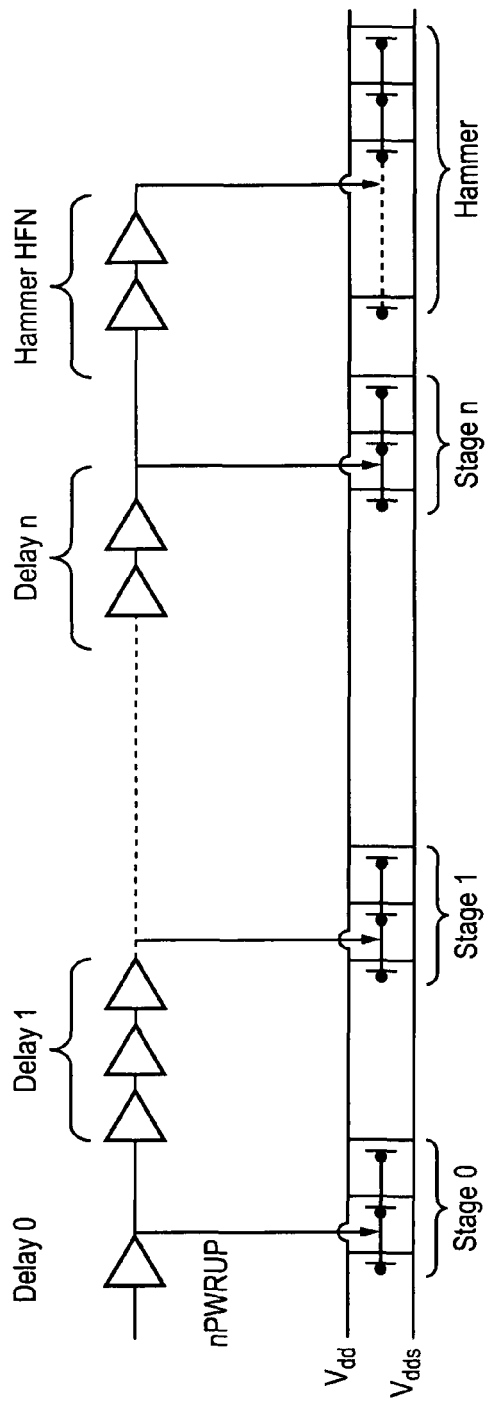
FIG. 6 schematically illustrates one example form of controller circuitry for sets of header transistors.

FIG. 6 schematically illustrates one form of controller circuitry 28 which may be used to control the switch on of the sets of header transistors. In this example the control circuitry 28 is formed of a long chain of inverters forming a delay line with taps at different points corresponding to different desired delays at which the different sets of header transistors should be switched on. While simple in design, this form of controller circuitry requires a relatively large number of inverters to be provided and this has an associated area and power consumption penalty. Furthermore, if there is a break in the delay line, then the hammer set of header transistors may not be switched on and the integrated circuit may not then be able to support processing operation by the logic circuitry 4, 6.

Figure 7:
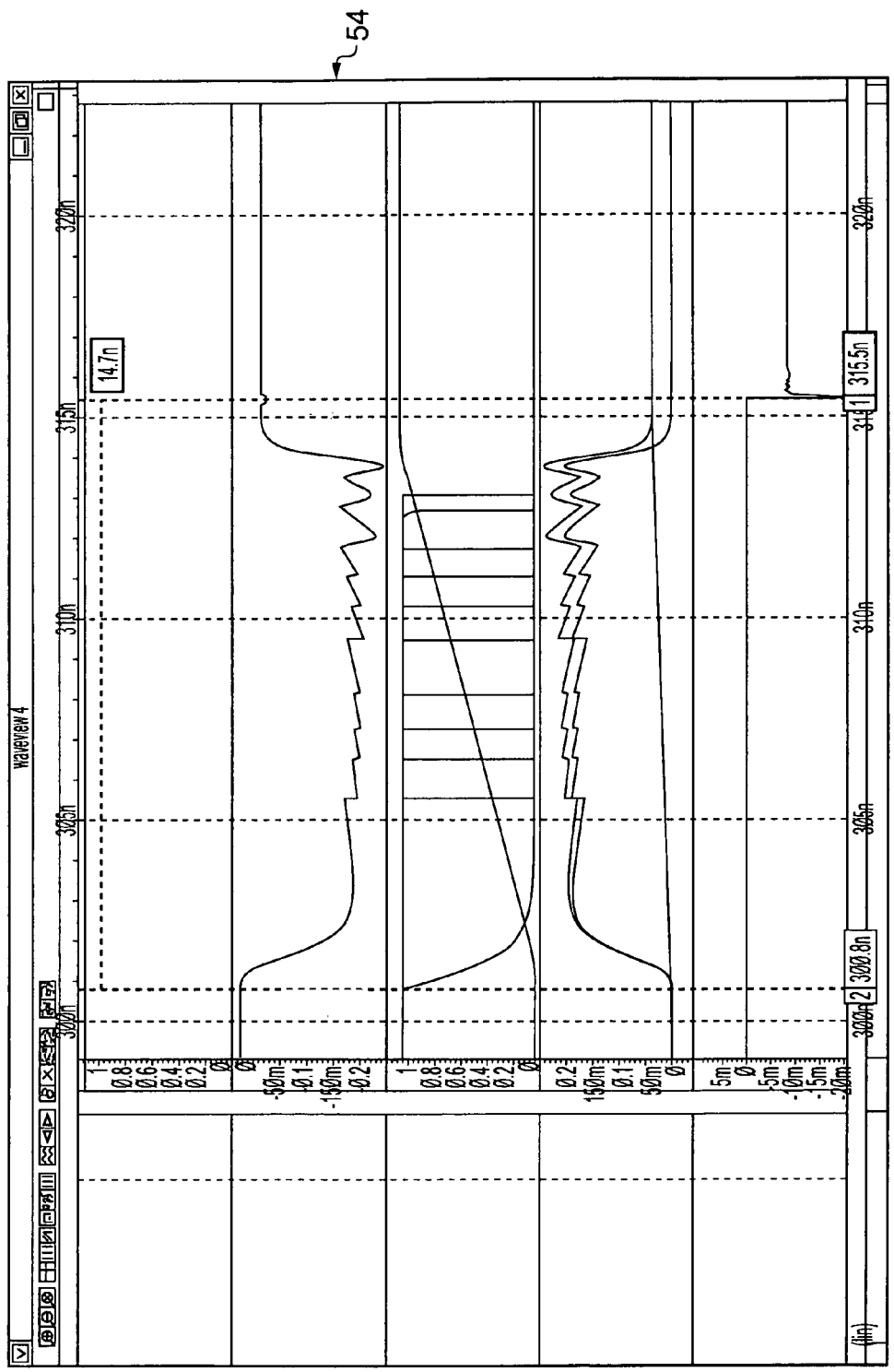
FIG. 7 illustrates a plurality of signal waveforms associated with a transition from a sleep state to an operating state.

FIG. 7 schematically illustrates a plurality of electrical signals observed when the techniques of switching from the sleep state to the operating state as described above are performed. The rise of the in-rush current up to the target level and then the firing of the different sets of other transistors seeking to maintain this target in-rush current can be observed. The signal lines 54 show the control signals which serve to switch on the different sets of header transistors and with each of these switch-on events there is an associated short-term rise in the in-rush current before this again starts to settle down due to the reduction in voltage difference between the first power supply conductor 8 and the second power supply conductor 10.

Figure 8:
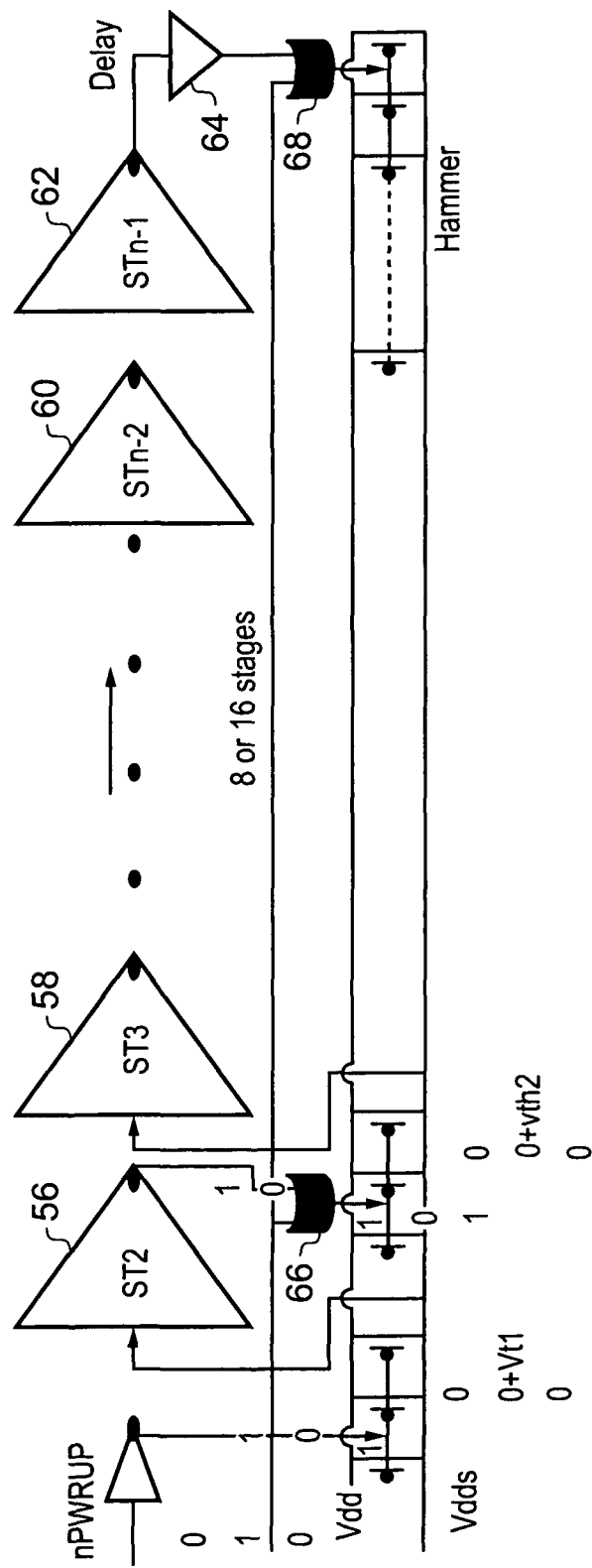
FIG. 8 is a second example embodiment of controller circuitry for controlling header transistors.

FIG. 8 schematically illustrates a second example embodiment of controller circuitry for controlling the switching on of the sets of header transistors. In this embodiment there are provided a plurality of Schmitt triggers 56, 58, 60 and 62. Each of these Schmitt triggers is responsible for firing (switching on) an associated set of header transistors when the voltage sensed on the virtual supply rail (second power supply conductor 10) reaches a predetermined trigger point. The individual Schmitt triggers 56 to 62 are formed with different trigger voltage levels corresponding to different points during the transition between the sleep state and the operating state. After firing of the final Schmitt trigger 62 switches on the final set of header transistors within the predetermined sequence, a delay element 64 imposes an additional delay before the hammer set of header transistors is switched on ready to provide the necessary current needed for active processing by the logic circuitry 4, 6. Reset circuitry 66, 68 is associated with the Schmitt triggers and the hammer set of header transistors. This reset circuitry is used to force the header transistors to switch off when it is desired to transition from the operating state to the sleep state.

Figure 9:
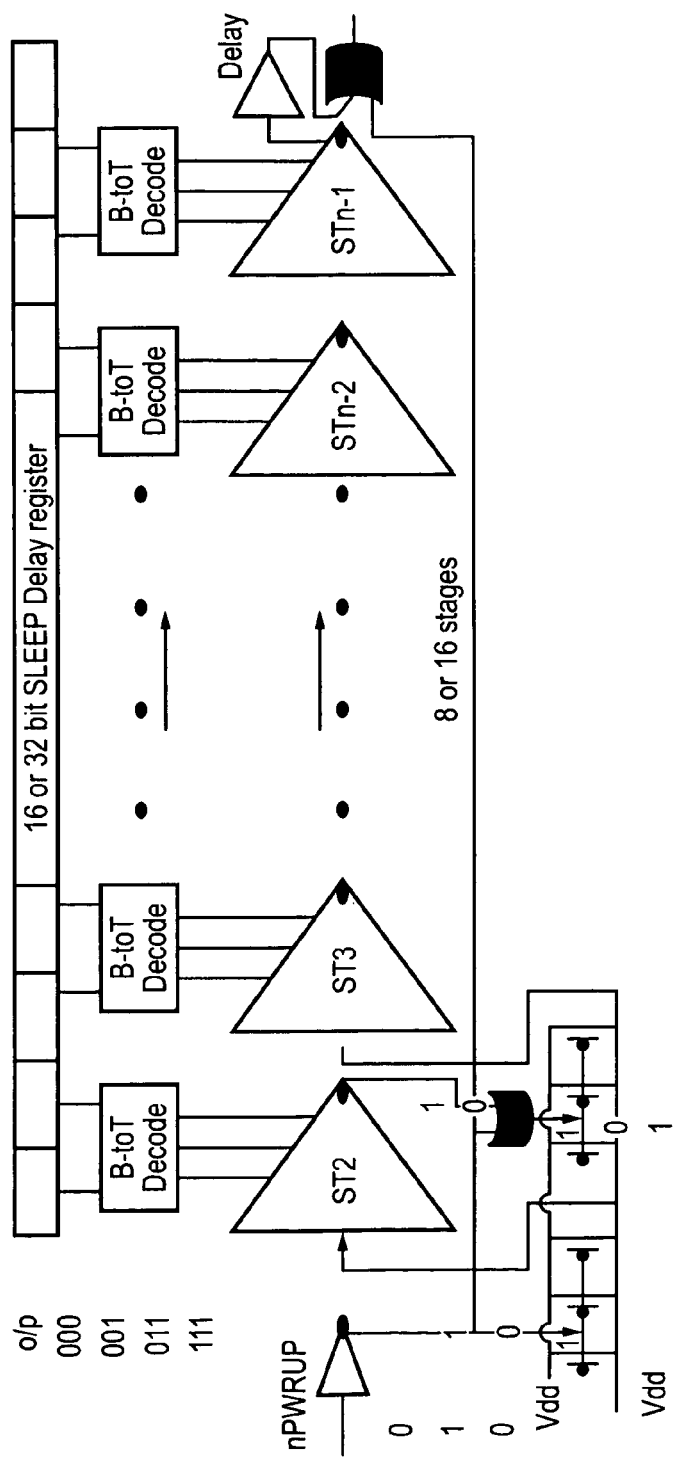
FIG. 9 schematically illustrates a third example embodiment of controller circuitry for controlling header transistors.

FIG. 9 schematically illustrates a third example embodiment of the controller circuitry 28. In this example the arrangement of FIG. 8 has been modified such that each of the Schmitt triggers is now programmable using a binary value to permit fine tuning of the trigger point of the Schmitt trigger concerned. This permits a fine tuning of the voltage differences at which each set of header transistors will be switched on in a manner that permits the in-rush current to be held closer to the ideal of the maximum tolerable in-rush current, thereby keeping low the latency associated with the change from the sleep state to the operating state.

Figure 10:
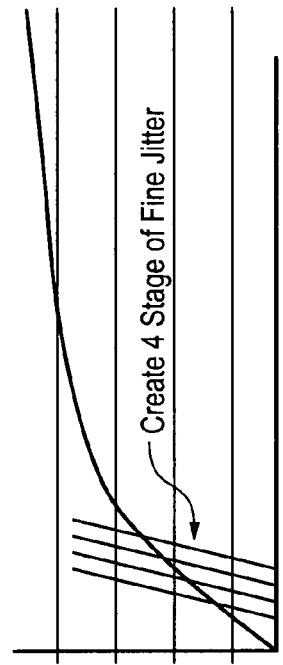
FIG. 10 schematically illustrates the programmability of Schmitt triggers within the controller circuitry of FIG. 9.

FIG. 10 illustrates how the programming of the individual Schmitt triggers can be used to create a small variation in the trip point of those triggers and thereby adjust the firing points of the individual sets of header transistors.

Figure 11:
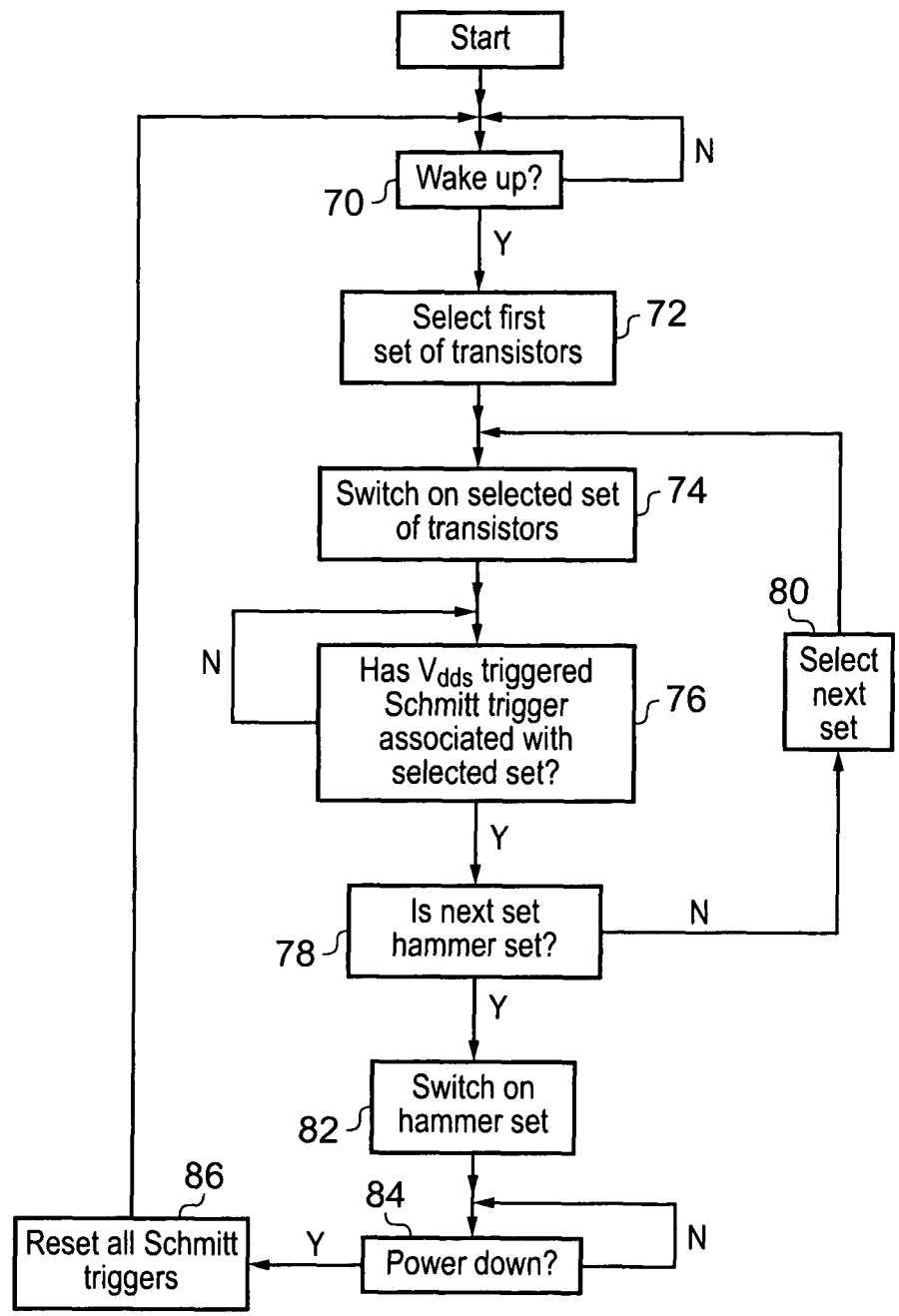
FIG. 11 is a flow diagram schematically illustrating the operation of the example embodiments of FIGS. 8 and 9.

FIG. 11 is a flow diagram schematically illustrating the operation of the controller circuitry 28 of FIG. 8. At step 70 processing waits until a wake up event is received indicating that a transition from the sleep state to the operating state is desired. At step 72 the first set of header transistors is selected. Step 74 switches on this selected set of header transistors. Processing waits at step 76 until the virtual rail voltage has triggered the Schmitt trigger associated with the currently selected set of header transistors. When the Schmitt trigger has sensed the required voltage, then step 78 determines whether the next set of transistors is the hammer set. If the next set of transistors is not the hammer set, then this indicates that the switch from the sleep state to the operating state is not yet complete and processing proceeds to step 80 where the next set of header transistors is selected to be switched on at step 74. If the determination at step 78 is that the hammer set is the next set of transistors to be switched on, then processing proceeds to step 82 where the hammer set is switched on. At step 84 processing waits until a power down signal is received indicating that a transition from the operating state to the sleep state is required. When power down is required, step 86 resets all the Schmitt triggers and turns off the hammer set using the reset circuits 66, 68.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
a first power supply conductor configured to connect to an electrical power source;
a second power supply conductor;
a plurality of transistors configured to provide a current path from said first power supply conductor to said second power supply conductor;
logic circuitry coupled to said second power supply conductor and configured to draw electrical power from said second power supply conductor; and
controller circuitry coupled to said plurality of transistors and configured to control said plurality of transistors to switch from a high impedance state to a low impedance state of varying degree and thereby supply electrical power from said electrical power source to said logic circuitry via said first power supply conductor, said plurality of transistors and said second power supply conductor; wherein
said plurality of transistors are divided in to a plurality of sets of transistors, each set being switched together from said high impedance state to said low impedance state under control of said controller circuitry;
said controller circuitry is configured to switch said sets from said high impedance state to said low impedance state in a predetermined sequence; and
said controller circuitry senses a voltage of said second power supply conductor and controls switching of said sets from said high impedance state to said low impedance state following said predetermined sequence in dependence upon said voltage, wherein each of said sets has an associated trigger value of said voltage and said controller circuitry switches a set from said high impedance state to said low impedance state when said voltage reaches said associated trigger value, and said associated trigger values of said sets monotonically increase between sets following said predetermined sequence.

2. An integrated circuit as claimed in claim 1, wherein said controller circuitry uses for each set a Schmitt trigger circuit to sense when said voltage reaches said associated trigger value at which said set is switched from said high impedance state to said low impedance state.

3. An integrated circuit as claimed in claim 2, wherein said associated trigger value is a programmable value.

4. An integrated circuit as claimed in claim 2, wherein said controller circuitry includes a reset circuit for forcing a reset of said Schmitt trigger circuits.

5. An integrated circuit as claimed in claim 1, wherein each of said sets provides an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

6. An integrated circuit as claimed in claim 5, wherein said predetermined current range extends around a target in-rush current.

7. An integrated circuit as claimed in claim 6, wherein said predetermined current range extends around said target in-rush current to a level no less than twenty percent less than said target in-rush current.

8. An integrated circuit as claimed in claim 1, wherein said controller circuitry controls switching following said predetermined sequence between a sleep state in which said plurality of transistor have a high impedance state and said logic circuitry does not perform data processing operations to an operating state which said plurality of transistor have a low impedance state and said logic circuitry does perform data processing operations.

9. An integrated circuit comprising:
first power supply conductor means for connecting to an electrical power source;
second power supply conductor means for conducting power;
a plurality of transistor means for providing a current path from said first power supply conductor means to said second power supply conductor means;
logic means for drawing electrical power from said second power supply conductor means; and
controller means for controlling said plurality of transistor means to switch from a high impedance state to a low impedance state and thereby supply electrical power from said electrical power source to said logic means via said first power supply conductor means, said plurality of transistor means and said second power supply conductor means; wherein said plurality of transistor means are divided in to a plurality of sets of transistor means, each set being switched together from said high impedance state to said low impedance state of varying degree under control of said controller means;

said controller means is configured to switch said sets from said high impedance state to said low impedance state in a predetermined sequence; and said controller means senses a voltage of said second power supply conductor means and controls switching of said sets from said high impedance state to said low impedance state following said predetermined sequence in dependence upon said voltage, wherein each of said sets has an associated trigger value of said voltage and said controller means switches a set from said high impedance state to said low impedance state when said voltage reaches said associated trigger value, and said associated trigger values of said sets monotonically increase between sets following said predetermined sequence.

10. A method of operating an integrated circuit, said method comprising the steps of:
connecting to an electrical power source using a first power supply conductor;
conducting power with a second power supply conductor jeans;
providing a current path from said first power supply conductor to said second power supply conductor through a plurality of transistors;
drawing electrical power for logic circuitry from said second power supply conductor; and
controlling said plurality of transistors to switch from a high impedance state to a low impedance state of varying degree and thereby supply electrical power from said electrical power source to said logic circuitry via said first power supply conductor, said plurality of transistors and said second power supply conductors; wherein
said plurality of transistors are divided in to a plurality of sets of transistors, each set being switched together from said high impedance state to said low impedance state;
said sets are switched from said high impedance state to said low impedance state in a predetermined sequence; and
a voltage of said second power supply conductors is sensed and used to control switching of said sets from said high impedance state to said low impedance state following said predetermined sequence in dependence upon said voltage, wherein each of said sets has an associated trigger value of said voltage and said controlling step switches a set from said high impedance state to said low impedance state when said voltage reaches said associated trigger value, and said associated trigger values of said sets monotonically increase between sets following said predetermined sequence.

11. An integrated circuit comprising:
a first power supply conductor configured to connect to an electrical power source;
a second power supply conductor;
a plurality of transistors configured to provide a current path from said first power supply conductor to said second power supply conductor;
logic circuitry coupled to said second power supply conductor and configured to draw electrical power from said second power supply conductor; and controller circuitry coupled to said plurality of transistors and configured to control said plurality of transistors to switch from a high impedance state to a low impedance state and thereby supply electrical power from said electrical power source to said logic circuitry via said first power supply conductor, said plurality of transistors and said second power supply conductor; wherein said plurality of transistors are divided in to a plurality of sets of transistors, each set being switched together from said high impedance state to said low impedance state under control of said controller circuitry;

said controller circuitry is configured to switch said sets from said high impedance state to said low impedance state in a predetermined sequence; and each of said sets provides an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

12. An integrated circuit as claimed in claim 11, wherein said predetermined current range extends around a target in-rush current.

13. An integrated circuit as claimed in claim 12, wherein said predetermined current range extends from twenty percent below said target in-rush current to twenty percent above said target in-rush current.

14. An integrated circuit as claimed in claim 11, wherein said controller circuitry controls switching following said predetermined sequence between a sleep state in which said plurality of transistor have a high impedance state and said logic circuitry does not perform data processing operations to an operating state which said plurality of transistor have a low impedance state and said logic circuitry does perform data processing operations.

15. An integrated circuit as claimed in claim 11, wherein said controller circuitry senses a voltage of said second power supply conductor and controls switching of said sets from said high impedance state to said low impedance state following said predetermined sequence in dependence upon said voltage.

16. An integrated circuit as claimed in claim 15, wherein each of said sets has an associated trigger value of said voltage and said controller circuitry switches a set from said high impedance state to said low impedance state when said voltage reaches said associated trigger value.

17. An integrated circuit as claimed in claim 16, wherein said associated trigger values of said sets monotonically increase between sets following said predetermined sequence.

18. An integrated circuit as claimed in claim 16, wherein said controller circuitry uses for each set a Schmitt trigger circuit to sense when said voltage reaches said associated trigger value at which said set is switched from said high impedance state to said low impedance state.

19. An integrated circuit as claimed in claim 18, wherein said associated trigger value is a programmable value.

20. An integrated circuit as claimed in claim 18, wherein said controller circuitry includes a reset circuit for forcing a reset of said Schmitt trigger circuits.

21. An integrated circuit comprising:
first power supply conductor means for connecting to an electrical power source;

second power supply conductor means for conducting power;

a plurality of transistor means for providing a current path from said first power supply conductor means to said second power supply conductor means;

logic means for drawing electrical power from said second power supply conductor means; and controller means for controlling said plurality of transistor means to switch from a high impedance state to a low impedance state and thereby supply electrical power from said electrical power source to said logic means via said first power supply conductor means, said plurality of transistor means and said second power supply conductor means; wherein said plurality of transistor means are divided in to a plurality of sets of transistor means, each set being switched together from said high impedance state to said low impedance state under control of said controller means;

said controller means is configured to switch said sets from said high impedance state to said low impedance state in a predetermined sequence; and each of said sets provides an additional current path from said first power supply conductor means to said second power supply conductor means with an impedance such that a current flowing between said first power supply conductor means and said second power supply conductor means remains within a predetermined range as a voltage difference between said first power supply conductor means and said second power supply conductor means decreases and impedance of transistors in said low impedance state decreases.

22. A method of operating an integrated circuit, said method comprising the steps of:

connecting to an electrical power source using a first power supply conductor;

conducting power with a second power supply conductor means;

providing a current path from said first power supply conductor to said second power supply conductor through a plurality of transistors;

drawing electrical power for logic circuitry from said second power supply conductor; and controlling said plurality of transistors to switch from a high impedance state to a low impedance state and thereby supply electrical power from said electrical power source to said logic circuitry via said first power supply conductor, said plurality of transistors and said second power supply conductors; wherein said plurality of transistors are divided in to a plurality of sets of transistors, each set being switched together from said high impedance state to said low impedance state;

said sets are switched from said high impedance state to said low impedance state in a predetermined sequence; and each of said sets provides an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

23. A method of designing an integrated circuit, said integrated circuit comprising:

a first power supply conductor configured to connect to an electrical power source;

a second power supply conductor;

a plurality of transistors configured to provide a current path from said first power supply conductor to said second power supply conductor;

logic circuitry coupled to said second power supply conductor and configured to draw electrical power from said second power supply conductor; and controller circuitry coupled to said plurality of transistors and configured to control said plurality of transistors to switch from a high impedance state to a low impedance state and thereby supply electrical power from said electrical power source to said logic circuitry via said first power supply conductor, said plurality of transistors and said second power supply conductor; wherein said plurality of transistors are divided in to a plurality of sets of transistors, each set being switched together from said high impedance state to said low impedance state under control of said controller circuitry; and said controller circuitry is configured to switch said sets from said high impedance state to said low impedance state in a predetermined sequence;

said method of designing comprising the steps of:

selecting said transistors within each of said sets to provide an additional current path from said first power supply conductor to said second power supply conductor with an impedance such that a current flowing between said first power supply conductor and said second power supply conductor remains within a predetermined range as a voltage difference between said first power supply conductor and said second power supply conductor decreases and impedance of transistors in said low impedance state decreases.

* * * * *